United States Patent [19]

Lang et al.

[11] 4,130,358
[45] Dec. 19, 1978

[54] PHOTOGRAPHIC CAMERA WITH INTERCHANGEABLE LENS

[75] Inventors: Rudolf Lang, Grafing Bahnhof; Gerhard Schwarz, Munich, both of Germany

[73] Assignee: Carl Zeiss Stiftung, Heidenhein on the Brenz, Germany

[21] Appl. No.: 739,642

[22] Filed: Nov. 8, 1976

[30] Foreign Application Priority Data

Nov. 17, 1975 [DE] Fed. Rep. of Germany ....... 2551571

[51] Int. Cl.$^2$ ............................................. G03B 17/00
[52] U.S. Cl. .................................. 354/289; 354/202; 354/286
[58] Field of Search ............... 354/202, 268, 286, 289, 354/46, 127

[56] References Cited

U.S. PATENT DOCUMENTS

| | | | |
|---|---|---|---|
| 2,975,688 | 3/1961 | Härter | 354/268 |
| 4,051,495 | 9/1977 | Rentschler et al. | 354/152 |

*Primary Examiner*—John Gonzales
*Attorney, Agent, or Firm*—Stonebraker, Shepard & Stephens

[57] ABSTRACT

A photographic camera has an interchangeable lens movable from a first or fully seated position on the camera body to a second disengaged position whereupon it may be removed from the camera body. An electric warning signal device has a circuit containing a switch responsive to the position of the interchangeable lens in such a way that the switch is closed to activate the warning signal as soon as the interchangeable lens begins to move away from its fully seated position. In a further development of the invention there is also a second switch in series with the first switch, and this second switch is kept closed so long as the interchangeable lens is in its first position or is in an intermediate position between its first and second positions, and this second switch is opened when the interchangeable lens reaches its second position disengaged from the camera body and ready to be removed therefrom. This second switch opens the circuit and saves drain on the battery when the interchangeable lens is completely removed from the camera.

7 Claims, 3 Drawing Figures

PHOTOGRAPHIC CAMERA WITH INTERCHANGEABLE LENS

BACKGROUND OF THE INVENTION

The invention relates to a photographic camera provided with an interchangeable lens, particularly a camera of the still camera kind, as distinguished from a motion picture or cine camera.

In such cameras, the interchangeable lens has a certain position, which may be described as the first position, in which the lens is fully and completely mounted on and engaged with the camera. It sometimes happens that, through carelessness or inattention on the part of the user of the camera, an interchangeable lens placed on the camera is not fully seated in the above described first position. It may be almost but not quite in the proper position.

An object of the invention is the provision of simple, effective, and inexpensive signalling means for signalling to the user of the camera that the interchangeable lens is not properly seated. In one form of the invention, this signalling means comprises an electric light which is lit while the interchangeable lens is in process of being applied to and seated on the camera (usually by a twisting motion) and which does not go out until the lens is fully and properly engaged with the camera body and is in its above mentioned first position. Stated another way, the warning light comes on as soon as the lens mount begins to move away from its first or fully seated position. This is accomplished by providing the circuit of the signalling device with a switch responsive to the position of the lens mount, the switch being open only when the lens is in its first position, and being closed or current-conductive in all other positions of the lens.

In a further development of the invention, the circuit of the warning signal also has a second switch which is likewise responsive to the position of the lens and which is open when no lens is present on the camera and is closed at the start of the engaging or twisting movement which occurs when the lens is first applied to the camera and starts to become engaged therewith. The commencement of the attaching motion thus activates the circuit by closing the second switch, operating the warning signal during the twisting-on motion of the lens mount until it reaches the fully mounted or engaged position, whereupon the first switch opens to stop the operation of the signal.

The warning signal is preferably produced by a lamp which lights up in a striking color and is visible on a wall of the camera which lies within the normal field of view of the user when he is using the camera in the normal way. According to a modification, light from the lamp is reflected into the viewfinder of the camera so that the warning signal will be visible to the user when he puts his eye to the viewfinder.

BRIEF DESCRIPTION OF THE DRAWINGS

FIG. 1 is a top plan view of a camera in accordance with a preferred embodiment of the invention, showing the interchangeable lens slightly separated from the camera body;

DESCRIPTION OF THE PREFERRED EMBODIMENTS

Figure 2:
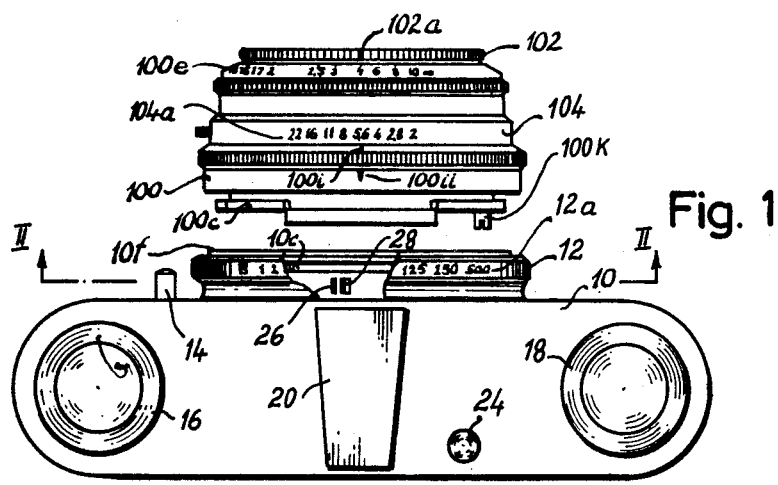
FIG. 2 is a fragmentary cross section through part of the camera, taken approximately on the line II—II of FIG. 1, and including a wiring diagram of the warning signal.

FIG. 1 shows somewhat schematically a still camera having a body indicated in general at 10, and having a built-in shutter, not further shown. The shutter speed or exposure time is set by a manually actuated setting ring 12 arranged for rotation on the front tube 10f of the camera body. The camera also has a release member or trigger 14, a film transport knob 16, a film rewind knob 18, and a direct viewfinder 20. These parts are all well known in the art, and need not be further described.

Within the body tube 10f there are several bayonet slots 10c which mate in the conventional manner with bayonet lugs or flanges 100c on the mount of the interchangeable lens indicated in general at 100. In the usual conventional manner, an interchangeable lens is applied to the camera by an axial movement toward the camera, along the optical axis, followed by a twisting movement rotating around the optical axis, whereupon the bayonet lugs 100c on the mount enter into and cooperate with the bayonet slots 10c on the camera body. The lens is focused in the conventional manner by turning a focusing ring 102 at the front of the lens mount, to bring the index mark 102a thereon opposite one or another of the focusing distance scale numerals 100e marked on a fixed part of the interchangeable lens mount or housing.

Within the mount or housing of the lens 100 there is the usual diaphragm having leaves or blades which can be adjusted to different apertures or f-values by the diaphragm setting ring 104 rotatable on the mount and carrying an aperture scale 104a which is read in conjunction with an index mark 100i on a fixed part of the mount. Another mark 100ii on the same fixed part of the mount cooperates with the shutter speed scale 12a rotatable on the camera.

Referring now to FIG. 2, the warning device has a circuit which includes a battery 22, a lamp 24 which gives off, for instance, a red light, and a switch having contact springs 26 and 28 mounted in an insulating block 10k on the camera body. The lamp 24 extends out of or is visible through a window in a wall or side of the camera which lies in the normal field of view of the user when he is using the camera in the normal expected manner. For instance, the top wall of the camera is a suitable place in which to have this warning lamp 24 or its window.

The contact springs 26, 28 are resilient and are so formed that they tend to press against each other in a closed or current-conducting relation. A contact actuator 100k on the interchangeable lens 100 is so positioned that in the final stage of the engagement of the lens with the camera body, just as the lens reaches what may be described as its "first" or fully seated position, the actuator 100k will come against the switch arm 26 (which is longer than the arm 28, as shown) and will press it away from the other switch contact member 28, to open the switch and thus open the circuit at this point, extinguishing the lamp 24. This engaging or seating motion of the lens onto the camera body is in the direction of the arrow shown in FIG. 2. Upon reverse movement, to disengage or unseat the lens from the camera body, the pressure of the actuator 100k is relieved from the resilient switch member 26 at the very beginning of the unseating twisting movement, so that the switch 26, 28 is closed and the warning signal light 24 immediately becomes lit.

The actuator 100k is preferably in the form of an insulating plastic member developed as an eccentric pin arranged on the face of the lens mount which faces the camera. It has a screw slot so that, by means of a screwdriver, the pin can be slightly turned, and since the head of the pin is eccentric with respect to the shank of the pin, a very fine adjustment of the exact position for opening and closing the electric switch can be made. The limit position of the lens mount, when seating it on the camera body, is determined by a stop pin or lug 10t on the camera body, engaged by an end of one of the bayonet lugs or flanges 100c as shown in FIG. 2. When the lens is fully seated on the camera body, it may be latched in its seated position by a conventional latch (not shown) which helps to insure that the interchangeable lens is placed in and remains in its proper fully seated position. But if the latch is ineffective for any reason, any movement of the interchangeable lens away from its "first" or fully seated position will immediately close the switch 26, 28 and activate the electric circuit to light the warning signal lamp 24.

Figure 3:
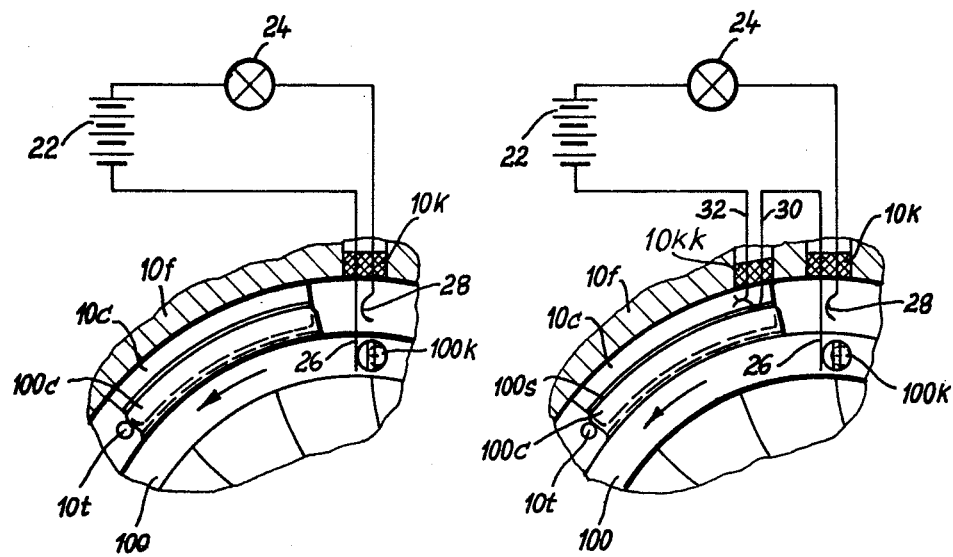
FIG. 3 is a view similar to FIG. 2, showing a modification.

In the embodiment illustrated in FIG. 2, the warning lamp will light up and remain lit from the time the interchangeable lens begins its disengaging movement until the time that another lens is applied to the camera and fully engaged. This may involve an undesirable drain on the battery if the camera is left without a fully engaged lens for any considerable length of time. Such a drain on the battery is avoided in a second embodiment of the invention, illustrated in FIG. 3.

In this second embodiment, the parts described in connection with FIG. 2 are essentially the same as before. In addition, the electric circuit has a second switch comprising contact springs 30 and 32 seated in an insulating block 10kk on the tube 10f of the camera body. These contact springs are so formed that the switch is normally open. The spring 30 extends into the path of an insulating covering 100s on the circumference of the bayonet lug or flange 100c. When this lug 100c is in a position underlying the switch contact member 30, it displaces this member 30 into current-conducting contact with the other switch member 32, closing the switch.

Thus when the lens is fully seated to its limit position in a counterclockwise direction (the direction of the arrow in FIG. 3) against the stop pin 10t, the switch 30, 32 will be kept closed by the insulating covering on the bayonet flange 100c, but the switch 26, 28 will be held open or non-conducting by the actuator 100k. However, just as soon as the lens begins to turn in the opposite or clockwise direction, from its fully engaged and seated "first" position toward its disengaged or "second" position, the switch 26, 28 will immediately close to light the warning lamp 24, while the switch 30, 32 remains closed during the entire disengaging motion of the lens. Only when the lens becomes fully disengaged so far as the bayonet connection is concerned, and is in a position to be removed from the camera by an axial movement, does the trailing end of the bayonet lug 100c ride out from under the switch spring 30 and allow the resilience of this switch spring to move it away from the switch member 32, opening the switch at this point to render the circuit inoperative so long as no interchangeable lens is applied to the camera. As soon as another interchangeable lens is applied and begins to turn counterclockwise toward its fully seated position, the bayonet lug on this lens will close the switch 30, 32 and light the light 24 until the lamp is extinguished by the action of the actuator 100k upon the completion of the seating movement.

What is claimed is:

1. A photographic camera having a camera body and an interchangeable lens movable relative to said body from a first position fully seated on and engaged with said body to a second position disengaged from said body and ready to be removed from said body, said camera comprising electric warning signal means, an electric circuit for operating said signal means, a first switch in said circuit, and means responsive to the position of said interchangeable lens for closing said switch to activate said signal means when said interchangeable lens moves away from its said first position.

2. A camera as defined in claim 1, wherein said interchangeable lens is disengaged from said body by a twisting movement from said first position to said second position and is removed from said body by an axial movement.

3. A camera as defined in claim 1, further comprising a second switch in said circuit in series with said first switch, and means responsive to the position of said interchangeable lens for opening said second switch when said interchangeable lens completes a movement from said first position to said second position.

4. A camera as defined in claim 1, wherein said switch has two contact springs, and an actuator mounted on said interchangeable lens causes said contact springs to make current-conductive contact with each other at the start of a disengaging movement of said interchangeable lens from said first position toward said second position.

5. A camera as defined in claim 4, wherein said actuator is in the form of an eccentric pin made of insulating material.

6. A camera as defined in claim 3, wherein said interchangeable lens includes a bayonet lug for engaging with a bayonet slot on said camera body when said lens is in said first position, and wherein said second switch has two contact springs tending to separate from each other and held in current-conductive contact with each other by an insulating layer on said bayonet lug.

7. A camera as defined in claim 1, wherein said warning signal means comprises a lamp providing, when lit, an indication visible on a wall of the camera body which is in the field of view of the user of the camera.

* * * * *